(No Model.)
J. B. TIMBERLAKE.
DISH HANDLE.
No. 249,807. Patented Nov. 22, 1881.
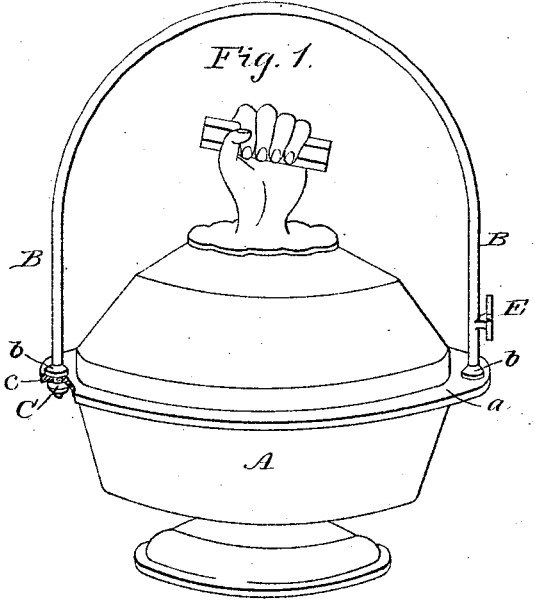
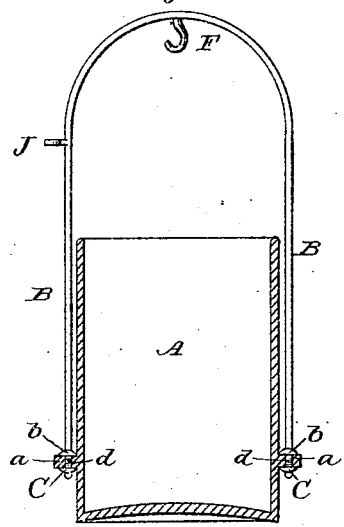
Witnesses:
H. N. Low
J. S. Barker
Inventor:
John B. Timberlake
by Doubleday & Bliss
Attys.
N. PETERS, Photo-Lithographer, Washington, D. C.

UNITED STATES PATENT OFFICE.

JOHN B. TIMBERLAKE, OF JACKSON, MICHIGAN.

DISH-HANDLE.

SPECIFICATION forming part of Letters Patent No. 249,807, dated November 22, 1881.

Application filed October 19, 1881. (No model.)

*To all whom it may concern:*

Be it known that I, JOHN B. TIMBERLAKE, a citizen of the United States of America, residing at Jackson, in the county of Jackson and State of Michigan, have invented certain new and useful Improvements in Dish-Handles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an improvement in the construction of detachable handles for dishes of glass or earthen ware, and in the method of attaching the same to said dishes or vessels, the purpose being to provide a tasty and convenient handle that can be cheaply constructed, and can be readily attached to and detached from the dish or vessel.

Figure 1 is a perspective view of a dish of the kind used upon tables for holding butter, and having my improved handle applied thereto. Fig. 2 is a side elevation of a vessel of another shape, of the kind ordinarily employed for holding pickles or similar articles, also having a handle of my improved construction.

In the drawings, A represents the body of a vessel or dish, which may be of the character of almost any of the ordinary vessels or dishes, two forms being selected in the drawings herein simply to show the method of attachment. These dishes or vessels for table purposes are generally formed to have one or more rims or beads between the upper and the lower edges, butter-dishes generally having a rim, or bead, or flange similar to that shown at $a$, Fig. 1, at or near the center of the dish. Dishes of the character shown in Fig. 2 generally have ornamental beads, or rims, or lugs near the upper or the lower edges, as shown at $a$ in said figure.

The dishes may, while in course of manufacture, be constructed to have the handle attached thereto, as they can then be provided with vertical apertures $c$ in said rims, beads, flanges, or lugs; but my invention is also applicable to vessels that have been finished without apertures therein, as such apertures can be readily formed without danger of marring the vessel, it being now well known that the trouble and danger once incident to the making of holes in fine glass or porcelain have been entirely obviated.

My improved handle is formed, preferably, of a single piece of thin metal, either round or polygonal in cross-section, bent into a substantially U shape. The legs B B of the handle are provided with shoulders or offsets $b\ b$ at a short distance from the ends. The ends of the legs are screw-threaded beyond or outside of said shoulders, as at $d$.

C C are nuts adapted to engage with the threaded ends of the legs B B. These nuts C and shoulders $b\ b$ may be made very ornamental, if desired.

The handle intended for a butter-dish is preferably provided with hooks or arms at E to serve as a knife-rest, or with a pronged support, J, and with a pendent hook, F, for suspending the cover, these parts, however, being shown in my previous Patent, No. 233,362, July 20, 1880.

When the handle is to be attached to the dish or vessel the nuts C C are first removed from the legs B B, and the screw-threaded parts $d\ d$ are passed through the apertures $c\ c$ till the shoulders $b\ b$ rest upon the upper face of the flange or rim having said apertures, and the nuts C C are then attached to the threaded parts and screwed tightly into place. When thus joined together there is no danger of the parts becoming unintentionally detached, and, moreover, the vessel can in this way be made very ornamental.

What I claim is—

The herein-described detachable handle for dishes, it having the legs B B, the upper connecting part, the screw-threaded parts $d\ d$, and the nuts C C, substantially as set forth.

In testimony whereof I affix my signature in presence of two witnesses.

JOHN B. TIMBERLAKE.

Witnesses:
 N. B. HALL,
 N. C. LOWE.